United States Patent
Abe et al.

(10) Patent No.: US 6,648,546 B1
(45) Date of Patent: Nov. 18, 2003

(54) STRUCTURE FOR EMBEDDING EMBEDDED-TYPE LIGHT

(75) Inventors: Yoichi Abe, Narita (JP); Katsuhiko Hagiwara, Narita (JP); Shoichi Kameta, Narita (JP); Shunji Kawabata, Narita (JP); Ryoichi Sato, Higashihiroshima (JP)

(73) Assignee: New Tokyo International Airport Authority, Chiba (JP)

( * ) Notice: Subject to any disclaimer, the term of this patent is extended or adjusted under 35 U.S.C. 154(b) by 0 days.

(21) Appl. No.: 09/622,515

(22) PCT Filed: Dec. 16, 1999

(86) PCT No.: PCT/JP99/07073

§ 371 (c)(1),
(2), (4) Date: Jan. 16, 2001

(87) PCT Pub. No.: WO00/36224

PCT Pub. Date: Jun. 22, 2000

(30) Foreign Application Priority Data

Dec. 17, 1998 (JP) .......................... 10-359846

(51) Int. Cl.[7] ............................................. G01F 9/03
(52) U.S. Cl. ....................................................... 404/12
(58) Field of Search .................. 404/6, 12; 362/153.1, 362/364, 365, 153; 116/209; 52/60

(56) References Cited

U.S. PATENT DOCUMENTS

| | | | |
|---|---|---|---|
| 207,549 A | * | 8/1878 | Powell |
| 3,881,697 A | * | 5/1975 | Glaesener .................. 256/13.1 |
| 4,140,466 A | * | 2/1979 | Snow et al. ................. 425/110 |
| 4,272,799 A | * | 6/1981 | Downing ..................... 362/145 |
| 4,617,616 A | * | 10/1986 | Juell et al. ................... 362/267 |
| 4,622,435 A | * | 11/1986 | Trainor et al. ................ 174/57 |
| 4,879,965 A | * | 11/1989 | Valley ......................... 116/209 |
| 5,426,267 A | * | 6/1995 | Underhill et al. ........... 181/210 |
| 5,582,477 A | * | 12/1996 | Reinert, Sr. ............... 362/153.1 |
| 5,779,349 A | * | 7/1998 | Reinert, Sr. ............... 362/153.1 |
| 5,785,409 A | * | 7/1998 | Reinert, Sr. ............... 362/153.1 |
| 5,957,573 A | * | 9/1999 | Wedekind et al. .......... 362/365 |
| 6,164,865 A | * | 12/2000 | McCallum ..................... 404/6 |
| 6,196,697 B1 | * | 3/2001 | Reinert, Sr. |

FOREIGN PATENT DOCUMENTS

| | | |
|---|---|---|
| JP | 59-50703 | 4/1984 |
| JP | 3-84108 | 4/1991 |
| JP | 8-165671 | 6/1996 |
| JP | 9-209320 | 8/1997 |

OTHER PUBLICATIONS

Patent Abstracts of Japan, Publication No. 09209320, Date of Publication Aug. 12, 1997, 2 pages.
English translation of the Abstract of PublicationNo. 3–84108, Date of Publication Apr. 9, 1991, 1 page.
Patent Abstracts of Japan, Publication No. 08165671, Date of Publication Jun. 25, 1996, 1 pages.

* cited by examiner

*Primary Examiner*—Thomas B. Will
*Assistant Examiner*—Raymond W Addie
(74) *Attorney, Agent, or Firm*—Rosenthal & Osha L.L.P.

(57) ABSTRACT

Plural penetration holes 3a are formed in the side wall of a base 3, and ends 6a, 7a of reinforcements 6, 7 of an RC pavement 2 laid around the light embedded area are inserted into the penetration holes 3a, and the peripheral edge of each penetration hole 3a and the ends 6a, 7a of the reinforcements 6, 7 are firmly fixed by welding. Since the ends 6a, 7a of the reinforcements 6, 7 of the RC pavement 2 and the base 3 are mutually fixed, the load applied to the inset light 1 from above is dispersed not only into the portion contacting with the lower side of the base 3 of the RC pavement 2, but also into the reinforcements 6, 7, and the sinking shearing resistance of the RC pavement 2 is extremely improved. Accordingly, if a heavy load of aircraft or the like is applied, the inset light capable of preventing sinking of the RC pavement in the lower part of the base is presented.

2 Claims, 2 Drawing Sheets

STRUCTURE FOR EMBEDDING EMBEDDED-TYPE LIGHT

TECHNICAL FIELD

The present invention relates to inset lights embedded in the concrete pavement, such as runway, taxiway, apron and road in an airport, and more particularly to the embedded structure of embedded objects such as inset light embedded in the reinforced concrete pavement (hereinafter called RC pavement).

BACKGROUND ART

A conventional inset light has a structure as shown in FIG. 4. This inset light 11 is buried in the runway in an airport, and is roughly composed of a cylindrical base 13 embedded in a concrete pavement 12, and a lamp body 15 mounted on the base 13 through a lamp body holding member 14 called adjusting ring. The inset light 11 can be embedded easily in a specified position when overlayed concrete 12 is paved on the existing pavement.

In the conventional inset light 11, however, since the outer circumference of the base 13 is a flat cylindrical body, the coupling force (engagement) between the outer circumference of the base 13 and the concrete pavement 12 is not strong by nature. When a heavy load of aircraft or the like is applied on the top of the light, since the resistance between the cylindrical outer circumference of the base 13 and the concrete pavement 12 is small, the majority of the load generates in the lower part of concentratedly the base 13. As the load exceeding the strength of the concrete pavement at the lower side of the base 13 is applied from the bottom 13a of the base 13, a large sinking shearing force acts on the inset light portion of the concrete pavement 12, and thereby the concrete portion of the lower side of the base may be broken, and the light is likely to sink.

At this time, in the concrete pavement 12 beneath the base 13, simultaneously with the load pressure acting directly from the lower side of the base 13, a normal stress for direction of bottom (shearing force) acts from the edge portion at the lower end of the base 32. Therefore, when a heavy load of aircraft or the repetition loading on the inset light 11, the portion of the concrete pavement 12 supporting the base 13 may be cracked in a short period and be brittle, thereby plunging the inset light 11.

An object of the invention is to present an embedded structure of embedded objects such as inset lights capable of preventing concentration of the load beneath the base of the inset lights if a heavy load of aircraft or the like is applied.

DISCLOSURE OF THE INVENTION

To solve the problems, a first aspect of the invention relates to an inset light comprising a cylindrical base embedded in a reinforced concrete pavement, and a lamp body held on the top of the base for emitting light to outside of the pavement surface, in which the end portions of the reinforcement of the reinforced concrete pavement and the base are fixed mutually.

A second aspect of the invention relates to the inset light of claim 1, in which holes are formed in the side wall of the base, and the end portions of the reinforcement are inserted in the holes, and welded and fixed.

A third aspect of the invention relates to an embedded structure of an inset light of claim 1 or 2 being applied to a reinforced structure other than the reinforced concrete pavement.

A fourth aspect of the invention relates to an embedded structure of an inset light of claim 1, 2 or 3, being applied to an embedded structure other than the inset light.

BEST MODE FOR CARRYING OUT THE INVENTION

Figure 1:
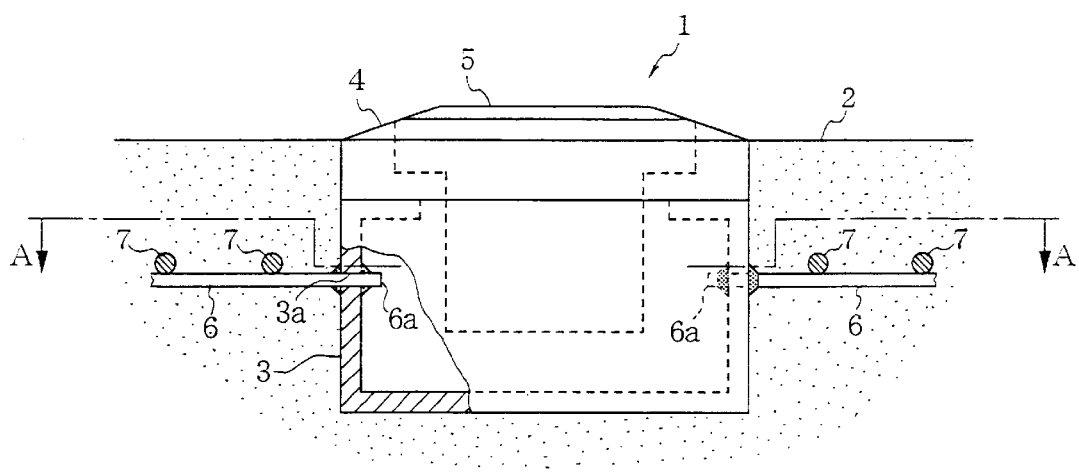
FIG. 1 is a partially cross section through thickness of embedded state of inset light showing an embodiment of the invention.

Embodiments of the invention are described below by referring to the drawings.

Figure 2:
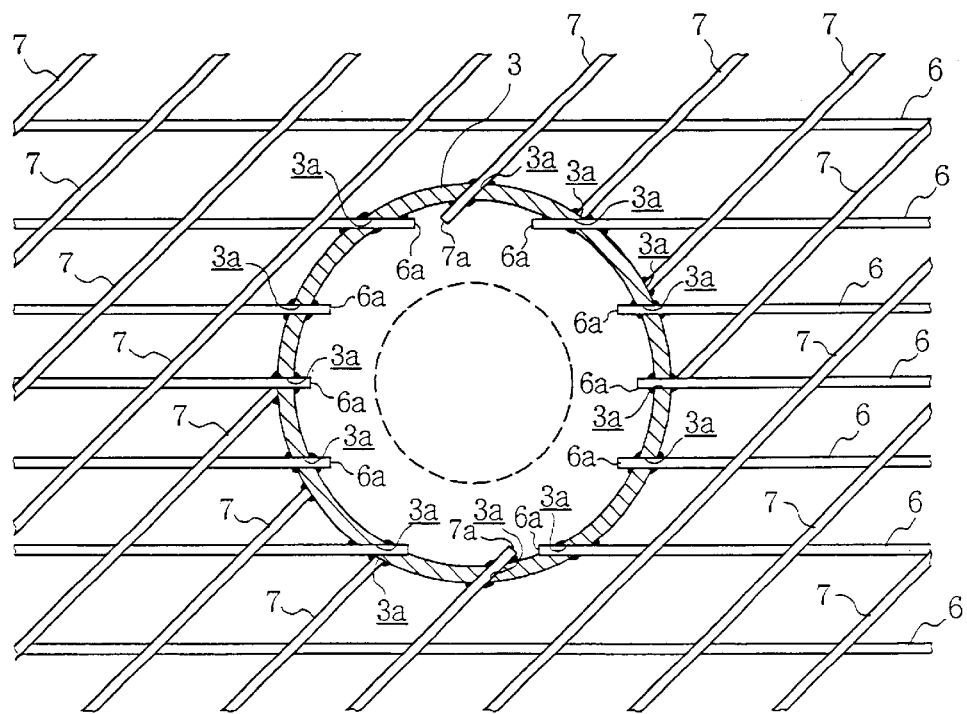
FIG. 2 is a sectional view A—A of FIG. 1.

FIG. 1 is a partially cross section through thickness of embedded state of inset light showing an embodiment of the invention, and FIG. 2 is a sectional view A—A of FIG. 1.

The inset light 1 of the embodiment is embedded in an airport runway, and is roughly composed of a cylindrical base 3 embedded in an RC pavement 2 composing the runway, and a lamp body 5 as the light source mounted on the base 3 by way of a ring-shaped lamp body holding member 4. Inside the base 3, transformer and other power source circuits are provided, and the power is supplied by electric cables laid in conduit pipes.

Figure 4:
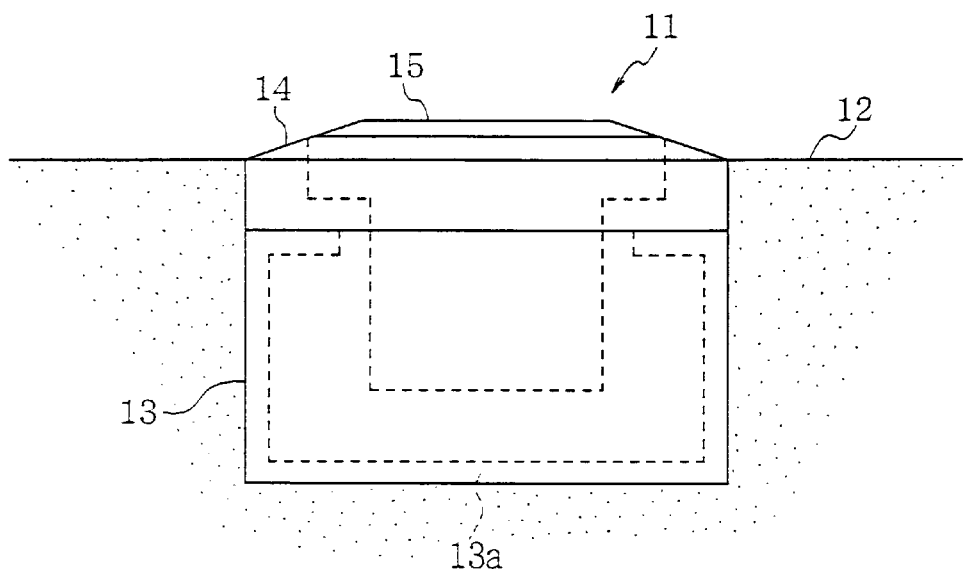
FIG. 4 is a sectional view of embedded state of a conventional inset light.

The structure of the lamp body holding member 4 and lamp body 5 of this inset light 1 is same as the conventional one shown in FIG. 4, but it is a feature of the invention that the structure of the base 3 is completely different. That is, plural penetration holes 3a are formed in the side wall of the base 3 of the invention, and ends 6a, 7a of reinforcements 6, 7 of the RC pavement 2 laid around the light embedded area are inserted into the penetration holes 3a, and the peripheral edge of each hole 3a and the ends 6a, 7a of the reinforcements 6, 7 are firmly fixed by welding. The base 3 is embedded and fixed in the RC pavement 2 by inserting the ends 6a, 7a of the reinforcements 6, 7 laid around the light embedded area into the penetration holes 3a, on the existing pavement surface, welding the peripheral edge of each penetration hole 3a and the ends 6a, 7a of the reinforcements 6, 7, and paved new concrete. The lamp body holding member 4 and lamp body 5 are installed after setting the base 3.

Thus, since the ends 6a, 7a of the reinforcements 6, 7 of the RC pavement 2 and the base 3 are mutually fixed, the load applied to the inset light 1 from above is dispersed not only into the portion contacting with the lower side of the base 3 of the RC pavement 2, but also into the reinforcements 6, 7, and the supporting force (sinking shearing resistance) of the RC pavement 2 is extremely improved.

Therefore, if a heavy load of aircraft or the like is applied on the inset light 1, concentration of its load in the lower part of the base 3 is prevented, and sinking of the inset light 1 is prevented.

Welding of the penetration holes 3a of the base 3 and the ends 6a, 7a of the reinforcements 6, 7 should be preferably done on both inside and outside of the base 3, but welding may be done on the outside only as far as the connection strength and water tightness between the base 3 and the reinforcements 6, 7 are sufficiently obtained.

Figure 3:
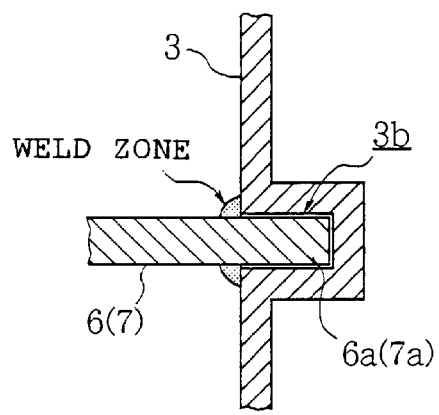
FIG. 3 is a partial sectional view of inset light showing other embodiment of the invention.

Instead of the penetration holes 3a, recesses 3b may be formed in the outer wall of the base 3 as shown in FIG. 3, and the ends 6a, 7a of the reinforcements 6, 7 may be inserted into the recesses 3b, and welded.

The welding job of the base 3 and reinforcements 6, 7 may be done at a different site from the pavement actual field. That is, the base 3 and reinforcements 6, 7 may be fabricated into one assembly at a work shop, and brought into the field.

In the above embodiments, the inset light embedded in the runway in an airport is explained, but the invention is not limited to these examples, but may be effectively applied in embedded objects embedded and supported in various RC pavements subject to heavy loads, such as taxiway, apron and road in an airport.

Also in the embodiments, the inset light or other embedded objects are described to be embedded and supported in the reinforced concrete, but the invention may be applied to other embedded objects and inset lights embedded in the structure having reinforcements, other than reinforced concrete pavement.

As explained herein, the invention brings about the following excellent effects.

According to the invention as set forth in claim 1, since the ends of the reinforcements of the RC pavement and the base are mutually fixed, the load applied to the inset light from above is dispersed not only into the portion contacting with the lower side of the base of the RC pavement, but also into the reinforcements fixed on the outer circumference of the base, and the sinking shearing resistance of the RC pavement is extremely improved. Therefore, if a heavy load of aircraft or the like is applied on the inset light, concentration of its load in the lower part of the base is prevented, and sinking of the inset light is prevented.

According to the invention as set forth in claim 2, by forming holes in the side wall of the base and inserting the ends of reinforcements into the holes, and welding and fixing, the reinforcements of RC pavement and the base are mutually fixed firmly into one body, so that the effects of claim 1 of the invention are exhibited more securely.

According to the invention as set forth in claim 3, since the embedded structure of the inset light of claim 2 or 3 is applied in the reinforced structure other than the reinforced concrete pavement, the same effects as in claims 1 and 2 are obtained in the embedded objects generally embedded in the reinforced structure.

According to the invention as set forth in claim 4, since the embedded structure of claim 1, 2 or 3 is applied to embedded objects other than the inset light, the same effects as in claims 1 and 2 are obtained in the embedded objects other than the inset light.

What is claimed is:

1. An embedded structure of an inset light, being an inset light comprising a cylindrical base embedded in a reinforced concrete pavement, and a lamp body held on top of said base for emitting light to outside of the pavement surface, wherein end portions of the reinforcement of said reinforced concrete pavement and said base are fixed such that a load applied to the inset light from above is dispersed among a lower side of the base and the reinforcement of said reinforced concrete pavement.

2. An embedded structure of an inset light, being an inset light comprising a cylindrical base embedded in a reinforced concrete pavement, and a lamp body held on top of said base for emitting light to outside of the pavement surface, wherein holes are formed in a side wall of said base, and end portions of said reinforcement of the reinforced concrete pavement are inserted in said holes, and fixed by welding the end portions of the reinforcement and a peripheral edge of the hole.

* * * * *